United States Patent
Pothos et al.

(10) Patent No.: US 7,970,838 B2
(45) Date of Patent: Jun. 28, 2011

(54) MOBILE REMOTE DEVICE MANAGEMENT

(75) Inventors: Kirk Pothos, Webster, NY (US); Shawn Kammerdiener, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 177 days.

(21) Appl. No.: 12/122,992

(22) Filed: May 19, 2008

(65) Prior Publication Data

US 2009/0287767 A1 Nov. 19, 2009

(51) Int. Cl.
*G06F 15/16* (2006.01)
(52) U.S. Cl. ........ 709/206; 709/203; 709/223; 358/1.15
(58) Field of Classification Search .................. 709/203, 709/223, 206; 358/1.15
See application file for complete search history.

(56) References Cited

U.S. PATENT DOCUMENTS

| | | | |
|---|---|---|---|
| 5,956,698 A | 9/1999 | Lacheze et al. | |
| 5,960,167 A | 9/1999 | Roberts et al. | |
| 6,032,004 A | 2/2000 | Mirabella, Jr. et al. | |
| 6,446,134 B1 | 9/2002 | Nakamura | |
| 6,487,189 B1 | 11/2002 | Eldridge et al. | |
| 6,782,345 B1 | 8/2004 | Siegel et al. | |
| 2004/0001226 A1* | 1/2004 | Ohtuka | 358/1.15 |
| 2004/0090650 A1* | 5/2004 | Okazawa | 358/1.15 |
| 2004/0167974 A1* | 8/2004 | Bunn et al. | 709/223 |
| 2005/0270569 A1* | 12/2005 | Hayashi | 358/1.15 |
| 2008/0028060 A1* | 1/2008 | Fukasawa et al. | 709/223 |

OTHER PUBLICATIONS

Reid, K.N. and Lin, Ku-Chin, Dynamic Behavior of Dancer Subsystems in Web Transport Systems, Proceedings of the Second International Conference on Web Handling, p. 135-146, Jun. 6-9, 1993).

* cited by examiner

*Primary Examiner* — Wing F Chan
*Assistant Examiner* — Hitesh Patel
(74) *Attorney, Agent, or Firm* — Gibb I.P. Law Firm, LLC

(57) ABSTRACT

A mail relay server decodes a received command electronic message to produce and issue a command to a service manager server which is directed to a device manager server for a target printing device. The device manager server produces and issues instructions to the target printing device. If the command includes a request for the reply, the process of executing the instruction in the target printing device includes the target printing device producing and issuing, the reply to the device manager server. The device manager server collects any multi packet reply and transmits the reply to the service manager server which directs the reply to the mail relay server. The mail relay server encodes the received reply to produce and issue a reply electronic message to the requestor.

12 Claims, 2 Drawing Sheets

MOBILE REMOTE DEVICE MANAGEMENT

BACKGROUND AND SUMMARY

Embodiments herein generally relate to printing device management systems and more particularly to an improved system and method that allows service engineers to remotely communicate with printing devices that are to be serviced.

There are many computerized systems utilized to assist field service engineers to perform their job more efficiently. One such system monitors the operating status of printers, copiers, multifunction devices, and other similar printing equipment. For example, such printing equipment can be continuously or periodically connected to a wide area or local network and has the ability to send error messages or results of diagnostic processing to a centralized server (service manager server). If the service engineer is connected to the network and properly logged into the appropriate security level, they can remotely operate the printing equipment to obtain data there from, or to cause the print equipment to perform some action. However, if the service engineer is away from a network (e.g., is on the road or at a different customer site) and only possesses a personal digital assistant or cell phone, they usually cannot log into the appropriate security level, and therefore cannot perform any remote actions on the printing device that needs service.

Therefore, if a customer service engineer (CSE) in the field needed to find information about a managed device, that service engineer would need access to, for example, a web site that allows command or query functions to be performed on the managed device. Customer service engineers that are in the field performing service calls would not have access to the service managers, and would not obtain information on devices, perform remote operations, or control on devices while in the field.

Currently obtaining device information or performing device remote control requires that a customer service engineer call and request information such as location and printer information from a coworker who is connected to the service manager server. Alternatively, the service engineer could connect remotely to a service manager server if a network connection is available, or prepare such information before field call. Performing remote control of a device may also require the service engineer to travel to a different location to able to connect to the controlling service manager server and to have access to the user interface for performing the needed operation.

In order to address such issues, a method embodiment herein begins when an electronic message is received from a requester. This "command" electronic message comprises information necessary to instruct a mail relay server regarding what operation is to be performed to obey the command, a target printing device, any reply expected, etc. For example, the command can comprise an action instruction, a data request, etc. The command electronic message can comprise any form of electronic message including one processed through an e-mail messaging system and a short messaging system (e.g., a text messaging system, an instant messaging system, etc.).

The method uses the mail relay server to decode the command electronic message to produce and issue a command to a service manager server. The command from the service manager server is directed to a device manager server responsible for managing the target printing device. The device manager server formats the command to be compatible with the target printing device to produce and issue an instruction to the target printing device.

The target printing device then executes the instruction, such as running a reboot sequence, running a diagnostic sequence, running an internal parameter update sequence, etc. If the command includes a request for the reply, the process of executing the instruction includes producing, by the target printing device, the reply and issuing the reply to the device manager server. For example, the reply can comprise data and/or a confirmation that the command was executed.

The device manager server collects the reply if it is in many packets and transmits the reply to the service manager server. Once the reply is transmitted, the service manager server directs the reply to the mail relay server. After the reply is directed to the mail relay server, the mail relay server encodes the reply to produce and issue a reply electronic message to the requester.

One feature of such an embodiment is that the mail relay server, the service manager server, and the target printing device that perform the method in a fully automated process that is based solely on the command electronic message and is performed without additional input from users.

In addition, system embodiments are disclosed herein. Such a system embodiment can include at least one mail relay servers that receives the command electronic message from the requester. The mail relay server decodes the command electronic message to produce and issue the command. At least one service manager server is operatively connected to the mail relay server. The service manager server receives the command from the mail relay server. Further, the system includes one or more device manager server that are operatively connected to the service manager server. Each device manager can be connected to many different printing devices.

The service manager server identifies a selected device manager server (from the different device manager servers) that is responsible for managing the target printing device and transmits the command to the selected device manager server. The selected device manager server formats the command to be compatible with the target printing device to produce and issue an instruction to the target printing device. Then, the appropriate target printing device executes the instruction.

Again, if the command includes a request for the reply, the target printing device, when executing the instruction, produces the reply and issues the reply to the device manager server. If such a reply is produced by the target printing device, the device manager server collects the reply and transmits the reply to the service manager server. After the reply is transmitted to the service manager server, the service manager server directs the reply to the mail relay server. When the reply is directed to the mail relay server, the mail relay server encodes the reply to produce and issue a reply electronic message to the requester.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

While the present method and structure will be described in connection with embodiments thereof, it will be understood that this disclosure is not limited to the disclosed embodiments. On the contrary, this disclosure is intended to cover all alternatives, modifications, and equivalents as may be included within the spirit and scope, as defined by the appended claims.

Figure 1:
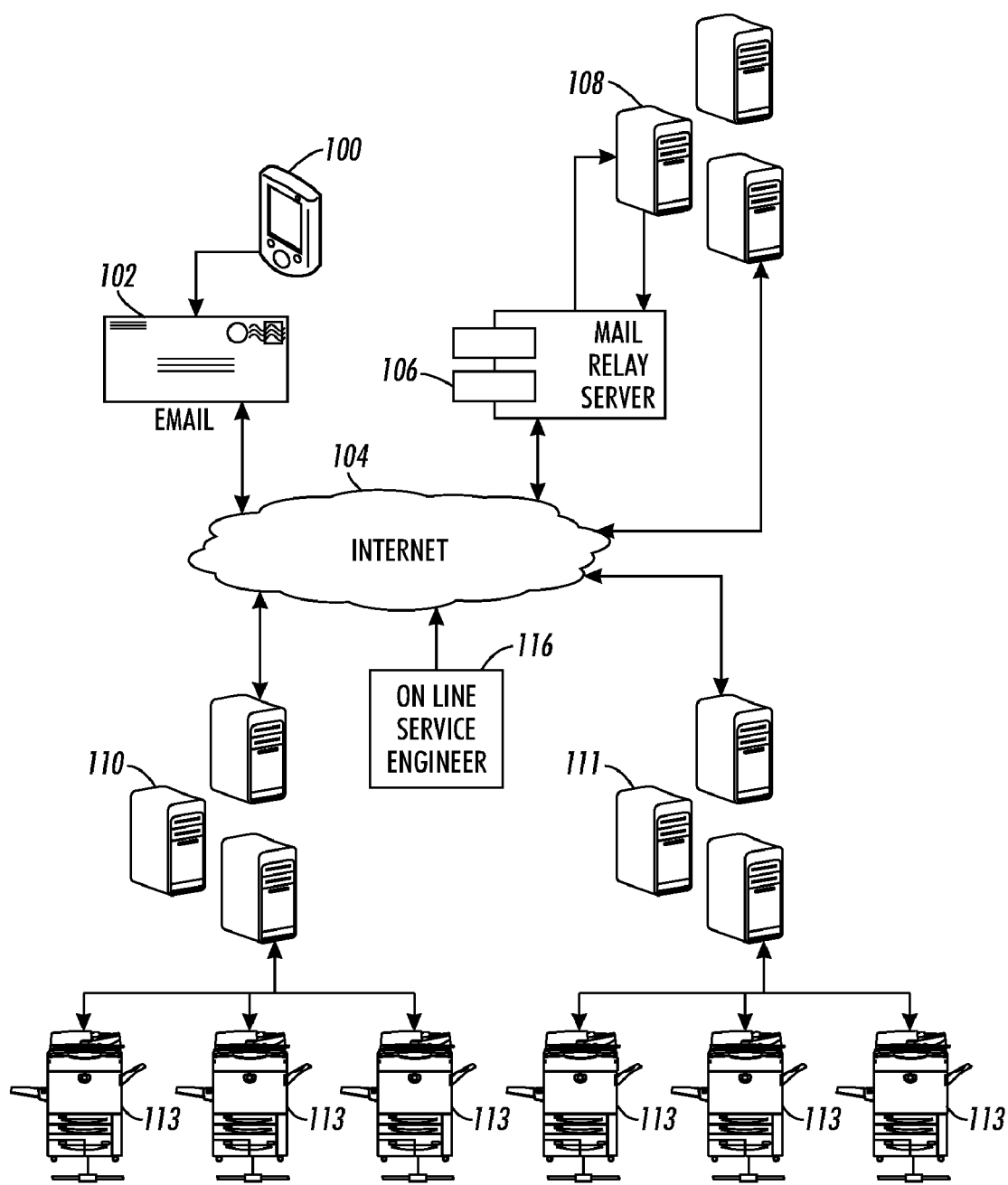
FIG. 1 is a schematic representation of a tensioning system according to embodiments herein.

One exemplary system embodiment herein is show in FIG. 1, where at least one mail relay server 106 receives the command electronic message 102 from the requestor 100 over a local area or wide area network 104, such as the internet. Mail servers and their operations are well-known to those ordinarily skilled in the art (for example, see U.S. Pat. No. 6,487,189, the complete disclosure of which is incorporated herein by reference) and the details of such devices are not discussed in detail herein. The mail relay server 106 decodes the command electronic message 102 to produce and issue the command.

At least one service manager server 108 is operatively connected to the mail relay server 106 and receives the command from the mail relay server 106. Further, the system includes one or more device manager servers 110 that are operatively connected to the service manager server 108. Each device manager can be connected to many different printing devices 112, 113. Service managers and device managers and their operations are well-known to those ordinarily skilled in the art (for example, see U.S. Pat. Nos. 5,956,698; 5,960,167; 6,446,134; and 6,782,345, the complete disclosures of which are incorporated herein by reference) and the details of such devices are not discussed in detail herein.

The service manager server 108 identifies a selected device manager server 110 (from the different device manager servers 110, 111) that is responsible for managing the target printing device 112 and transmits the command to the selected device manager server 110. The selected device manager server 110 formats the command to be compatible with the target printing device 112 to produce and issue an instruction to the target printing device 112. Then, the appropriate target printing device 112 executes the instruction.

If the command includes a request for the reply, the target printing device 112, when executing the instruction, produces the reply and issues the reply to the device manager server 110. If such a reply is produced by the target printing device 112, the device manager server 110 collects the reply and transmits the reply to the service manager server 108. After the reply is transmitted to the service manager server 108, the service manager server 108 directs the reply to the mail relay server 106. When the reply is directed to the mail relay server 106, the mail relay server 106 encodes the reply to produce and issue a reply electronic message 102 to the requester 100.

Thus, embodiments herein operate using electronic messages, such as the exemplary electronic message 102 that is composed and formatted to provide the information necessary to instruct the service manager server 108 what operation is to be performed, the target printing device 112, and the reply expected, if any. The mail relay server 106 decodes the message 102, and issues the command against the service manager server 108 to perform the requested operation.

The present embodiments can be contrasted with the way in which online requesters (service engineers) 116 communicate through the service manager server 108. Conventionally, an operator or service engineer 116 who is logged on to the service manager server 108 through the network 104 (indicating that the logged on requestor 100 has proper security clearances to communicate with the target printing device 112) communicates directly, potentially in real time with the target printing device 112 through the service manager server 108 and the device manager 110. In other words, the logged on requester 116 is directly connected to the target printing device 112, potentially in a real-time communication mode, where the instructions are immediately issued from the service engineer 116 to the target printing device 112 and feedback from the target printing device 112 is provided to the requester 100 as it is produced by the target printing device.

To the contrary, embodiments herein operate according to separate electronic messages 102 and do not have the requester 100 log on to the service manager server 108. Therefore, with embodiments herein, the present embodiments operate in a time-delayed manner as to be contrasted with the potentially real-time operations for the logged on requester 116. In addition, the service manager server 108 has an additional responsibility of checking each electronic command message 102 from the requester 100 to ensure that each electronic command message 102 is appropriate or properly authenticated (received from a requester that has rights to issue commands to the target printing device 112) and of checking each electronic reply message 102 to ensure that the reply can properly be sent to the requester 100 who requested it, and blocks the command or reply if it is not appropriate.

In other words, once the logged on service engineer 116 has been granted their access rights, the specific communications between the logged on service engineer and the target printing device 112 are not monitored for appropriateness. To the contrary, with embodiments herein, because each communication (electronic message 102) is an independent communication, each is checked and potentially blocked by the service manager server 108 to make sure that such a command or reply can be properly supplied to or retrieved from the target printing device 112.

In this process, the service manager server 108 can use any standard method for issuing a command or data request. The service manager server 108 will also communicate to the controlling device manager server 110 instance, and direct the device manager server 110 to perform the operation on the print device 112, and wait for the response (if any). The device manager server 110 will format the command for the specific printer 112, and transmit to the formatted instruction to the printing device 112.

The print device 112 will perform the operation, send the data, or return information to device manager server 110. The device manager server 110 will collect this data, package for transmission to service manager server 108 and send the reply in normal packet transmission. The service manager server 108 will receive this data, re-package it for e-mail and format and send the data (or command confirmation) to the requestor 100 who initiated the process. The requestor 100 will receive the e-mail or SMS message and can validate that the operation was performed.

Figure 2:
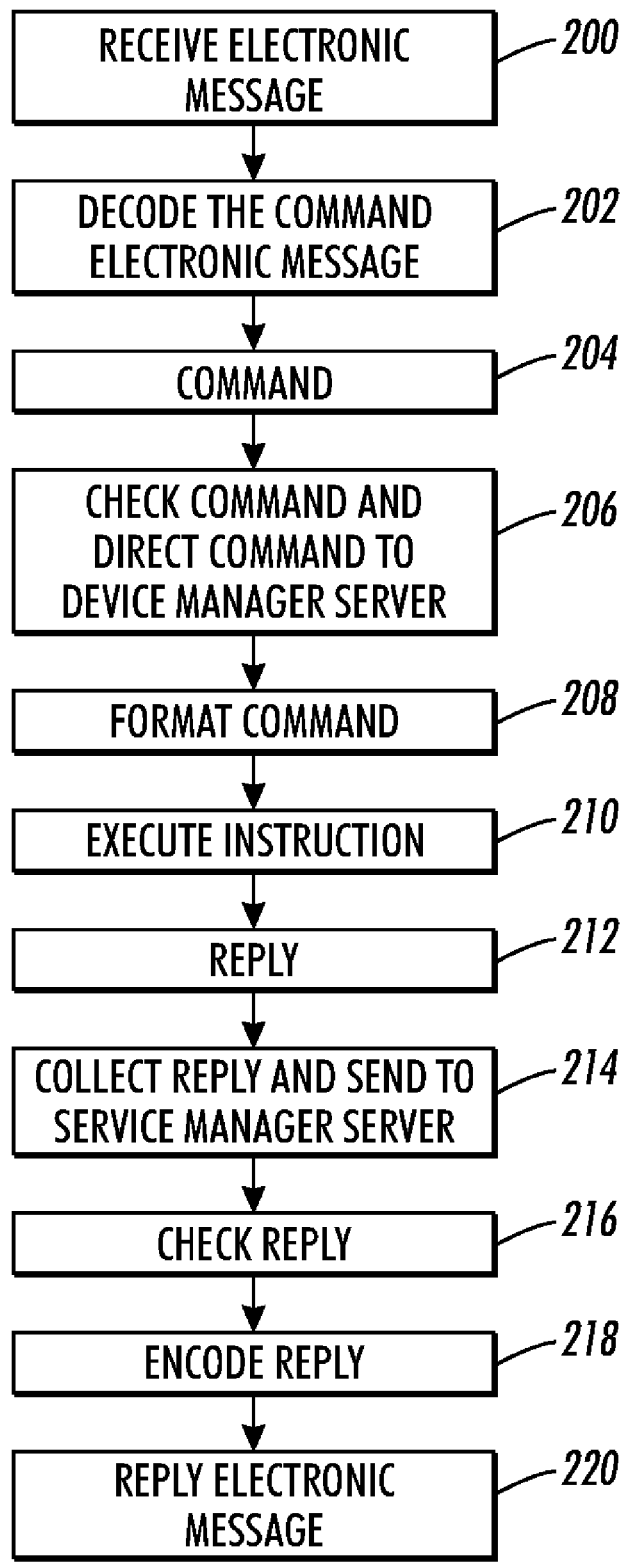
FIG. 2 is a flow diagram illustrating embodiments herein.

As shown in flowchart form in FIG. 2, one exemplary method embodiment herein begins in item 200 when the electronic message 102 (such as an e-mail message, instant message, or text message) is received from the requestor 100 over a local or wide area network, such as the internet 104. This "command" electronic message 102 comprises a command and the information necessary to instruct a mail relay server 106 regarding what operation is to be performed to obey the command, a target printing device 112, any reply expected, etc. For example, the command can comprise an action instruction, a data request, etc. The command electronic message 102 can comprise any form of electronic message including one processed through an e-mail messaging system and a short messaging system (e.g., an instant messaging system, etc.).

Then as shown in item 202, the method uses the mail relay server 106 to decode the command electronic message 102 to produce and issue the command 204 to the service manager server 108. The command from the service manager server 108 is checked for authenticity (each electronic communication is checked by the service manager server 108 to make sure that such a command can be supplied to the target printing device 112) and directed to a device manager server 110 responsible for managing the target printing device 112, in item 206.

In item 208, the device manager server 110 formats the command to be compatible with the target printing device 112 to produce and issue an instruction to the target printing device 112. In item 210, the target printing device 112 then executes the instruction, such as running a reboot sequence, running a diagnostic sequence, and running an internal parameter update sequence, etc.

If the command includes a request for the reply, the process of executing the instruction includes producing, by the target printing device 112, the reply (shown as item 212 in FIG. 2) and issuing the reply to the device manager server 110. For example, the reply 212 can comprise data and/or a confirmation that the command was executed.

The device manager server 110 collects the reply if for example, the reply is in many packets, and transmits the reply to the service manager server 108, as shown as item 214. Once the reply is transmitted to the service manager server 108, the service manager 108 checks the reply to make sure that such a reply can properly be supplied from the target printing device 112 to the requestor, in item 216. The service manage server 108 then directs the reply to the mail relay server 106. After the reply is directed to the mail relay server 106, the mail relay server 106 encodes the reply (item 218) to produce the reply and, in item 220, issue a reply electronic message 102 to the requester 100.

One feature of such an embodiment is that the mail relay server 106, the service manager server 108, and the target printing device 112 perform the method in a fully automated process that is based solely on the command electronic message 102 and is performed without additional input from users.

There are many scenarios that can be used to provide a few examples of how the embodiments herein can operate. For example in a first scenario, the mobile user may not part of a standardized helpdesk operation and may not have rights to log onto the service manager server 108 as the other user 116 can (e.g., may be a contractor customer service engineer). The contractor could be dispatched to fix an issue, or may already be on another call and in waiting state. With the embodiments herein, contractor could leverage the mobile device management to fetch the device health of the device they have been sent to fix. From this "health" information, the contractor may realize that the printing device requires a part, a reboot, or that the issue is not critical. In other words, the customer service engineer can learn more about issue ahead of time and the customer service engineer can determine if they need to take action and how quickly it needs to be taken, and can issue a remote command to make the service call more efficient In a second scenario, the service engineer again may not be part of a standardized helpdesk operation (e.g., again may be a contractor customer service engineer). The contractor could be dispatched to fix an issue and need to locate the printing device in a building. Using the embodiments herein, the customer service engineer can issue a printer information command (request for location data) to retrieve the device location information. Thus, the embodiments herein allow the customer service engineer to receive the printing device information and find the printing device that needs service.

In a third scenario, the mobile user may be part of a standardized helpdesk operation (e.g., may be a full time employed, corporate customer service engineer). The device manager server 110 could detect a fault incident and relay such information to the service manager server 108, which would route the incident to the mobile user. The mobile user thus receives assignment notification and utilizes the embodiments herein to triage, prioritize issues, and attempt remote commands.

Thus, the embodiments described above enable a customer service engineer to perform query and command tasks on devices in the field by transmitting instructions and replies to and from a mobile device using short message services or e-mail. The message 102 would be received by the server or forwarded to another server which can execute the command as if it had been performed by a user utilizing the standard service manager server 108 interface. The message 102 will have sufficient information to specify the remote command to perform, and all information necessary to route the command to the correct device, request the correct information, and return the reply to the correct requestor 100. The message 102 may contain a combination of formatting, content and data, individually or in combination that will provide the complete information necessary to allow the all of the collaborating servers to complete the task.

With embodiments herein, because the service engineer can remotely communicate instructions to and receive replies from printing devices, without having to be connected to the security network of the service manager server 108, and without having to rely upon any additional user input, such as user or helpdesk operator action, the productivity and effectiveness of service engineers is improved. Because the embodiments herein are fully automated, they do not require the service engineer (user) to participate in helpdesk operations. Further, access to features and command types is controlled at the user level in the service manager server.

The embodiments herein provide a powerful end-to-end workflow when coupled with helpdesk operations because the embodiments herein provide an e-mail-based remote diagnostic solution for mobile service engineers. Thus, the embodiments herein leverage existing device management and central control systems.

Many computerized devices are discussed above. Computerized devices that include chip-based central processing units (CPU's), input/output devices (including graphic user interfaces (GUI), memories, comparators, processors, etc. are well-known and readily available devices produced by manufactures such as International Business Machines Corporation, Armonk N.Y., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein.

The word printer, printing device, etc. as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the invention should not be implied or imported from any above example as limitations to any particular order, number, position, size, shape, angle, color, or material.

What is claimed is:

1. A method comprising:
   receiving, by a mail relay server, a command electronic message from a requestor, said command electronic message specifying an operation to be performed by a target printing device in order to service said target printing device;
   decoding, by said mail relay server, said command electronic message in order to produce and issue, to a service manager server, a command for performing said operation;
   checking, by said service manager server, that said requestor is authorized to issue said command for performing said operation to said target printing device without requiring said requestor to log on to said service manager server;
   when said requestor is authorized to issue said command for performing said operation to said target printing device, directing, by said service manager server, said command for performing said operation to a device manager server responsible for managing said target printing device;
   formatting, by said device manager server, said command for performing said operation to be compatible with said target printing device in order to produce and issue, to said target printing device, an instruction for performing said operation; and
   executing, by said target printing device, said instruction for performing said operation, said executing of said instruction comprising running, by said target printing device, at least one of a reboot sequence, a diagnostic sequence, and an internal parameter update sequence,
   wherein said mail relay server, said service manager server, and said target printing device perform said method in a fully automated process that is based solely on said command electronic message and is performed without additional input from users.

2. The method according to claim 1, wherein said command comprises one of an action instruction and a data request.

3. The method according to claim 1, wherein said command electronic message comprises a message processed through one of an e-mail messaging system, an instant messaging system, and a text messaging system.

4. A method comprising:
   receiving, by a mail relay server, a command electronic message from a requestor, said command electronic message specifying an operation to be performed by a target printing device in order to service said target printing device and further requesting a reply from said target printing device;
   decoding, by said mail relay server, said command electronic message in order to produce and issue, to a service manager server, a command for performing said operation;
   checking, by said service manager server, that said requestor is authorized to issue said command for performing said operation to said target printing device without requiring said requester to log on to said service manager server;
   when said requestor is authorized to issue said command for performing said operation to said target printing device, directing, by said service manager server, said command for performing said operation to a device manager server responsible for managing said target printing device,
   formatting, by said device manager server, said command for performing said operation to be compatible with said target printing device in order to produce and issue, to said target printing device, an instruction for performing said operation;
   executing, by said target printing device, said instruction for performing said operation, said executing of said instruction comprising running at least one of a reboot sequence and a diagnostic sequence and further producing and issuing said reply to said device manager server;
   transmitting, by said device manager server, said reply to said service manager server;
   directing, by said service manager server, said reply to said mail relay server; and
   encoding, by said mail relay server, said reply to produce and issue a reply electronic message to said requestor,
   wherein said mail relay server, said service manager server, and said target printing device perform said method in a fully automated process that is based solely on said command electronic message and is performed without additional input from users.

5. The method according to claim 4, wherein said command comprises one of an action instruction and a data request.

6. The method according to claim 4, wherein said reply comprises one of data and a confirmation that said command was executed.

7. A system comprising:
   at least one mail relay server receiving a command electronic message from a requestor, said command electronic message specifying an operation to be performed by a target printing device in order to service said target printing device and said mail relay server further decoding said command electronic message in order to produce and issue a command for performing said operation;
   at least one service manager server operatively connected to said mail relay server and receiving said command for performing said operation from said mail relay server; and
   at least one device manager server operatively connected to said service manager server and to a plurality of printing devices,
   said service manager server checking that said requestor is authorized to issue said command for performing said operation to said target printing device without requiring said requestor to log on to said service manager server,
   said service manager server identifying a selected device manager server from said at least one device manager server that is responsible for managing said target printing device and, when said requestor is authorized to issue said command for performing said operation to said target printing device, transmitting said command for performing said operation to said selected device manager server,
   said selected device manager server formatting said command for performing said operation to be compatible with said target printing device in order to produce and issue, to said target printing device, an instruction for performing said operation, and said target printing device executing said instruction for performing said operation, said executing of said instruction comprising running at least one of a reboot sequence, a diagnostic sequence, and an internal parameter update sequence, wherein said mail relay server, said service manager server, and said target printing device perform actions in a fully automated process that is based solely on said command electronic message and is performed without additional input from users.

8. The system according to claim 7, wherein said command comprises one of an action instruction and a data request.

9. The system according to claim 7, wherein said command electronic message comprises a message processed through one of an e-mail messaging system, an instant messaging system, and a text messaging system.

10. A system comprising:

at least one mail relay server receiving a command electronic message from a requestor, said command electronic message specifying an operation to be performed by a target printing device in order to service said target printing device and further requesting a reply from said target printing device and said mail relay server further decoding said command electronic message in order to produce and issue a command for performing said operation;

at least one service manager server operatively connected to said mail relay server and receiving said command for performing said operation; and at least one device manager server operatively connected to said service manager server and to a plurality of printing devices, said service manager server checking that said requestor is authorized to issue said command for performing said operation to said target printing device without requiring said requestor to log on to said service manager server, said service manager server identifying a selected device manager server from said at least one device manager server that is responsible for managing said target printing device and, when said requestor is authorized to issue said command for performing said operation to said target printing device, transmitting said command for performing said operation to said selected device manager server, said selected device manager server formatting said command for performing said operation to be compatible with said target printing device in order to produce and issue, to said target printing device, an instruction for performing said operation, said target printing device executing said instruction for performing said operation, said executing of said instruction comprising running at least one of a reboot sequence and a diagnostic sequence, and further producing said reply and transmitting said reply to said device manager server, said device manager server further transmitting said reply to said service manager server, said service manager server directing said reply to said mail relay server, and said mail relay server encoding said reply to produce and issue a reply electronic message to said requestor, wherein said mail relay server, said service manager server, and said target printing device perform actions in a fully automated process that is based solely on said command electronic message and is performed without additional input from users.

11. The system according to claim 10, wherein said command comprises one of an action instruction and a data request.

12. The system according to claim 10, wherein said reply comprises one of data and a confirmation that said command was executed.

* * * * *